June 20, 1944.  H. W. ALDEN ET AL  2,351,590
DRIVE AXLE
Filed July 29, 1940   3 Sheets-Sheet 3

Inventors
Herbert W. Alden
Beverly W. Keese
By Strauch & Hoffman
Attorneys

Patented June 20, 1944

2,351,590

UNITED STATES PATENT OFFICE 2,351,590

DRIVE AXLE

Herbert W. Alden, Detroit, Mich., and Beverly W. Keese, Oshkosh, Wis., assignors to The Timken-Detroit Axle Company, Detroit, Mich., a corporation of Ohio Application July 29, 1940, Serial No. 348,292

6 Claims. (Cl. 74—327)

The present invention relates to drive axles, and more particularly to automotive drive axles known in the art as two speed axles, having means for transmitting power at two different speed reductions. However, certain phases of the invention are not restricted to such use and may be advantageously employed in other types of axles or power transmitting mechanisms.

In Buckendale Patent No. 2,133,667, granted December 19, 1939, there is disclosed a two speed axle having a sliding clutch collar for selectively coupling high and low speed gears to a cross shaft, and although this axle marked a definite advance in the art, it is not adapted for installation in rear-engine vehicles.

In Alden Patent No. 2,120,594, granted June 14, 1938, there is disclosed a drive axle adapted for rear engine vehicles, but it is adapted to transmit power at a fixed value of speed reduction, and also requires comparatively large overhang of the gear-carrying housing, and hypoid gears must be used. Also, in order to get the bevel gear into the gear-carrying housing, an objectionably large opening must be provided in its base.

Accordingly, a major object of the invention is to improved the axle construction shown in Patents Nos. 2,120,594 and 2,183,667 and reduce their size, weight and cost substantially, without sacrificing any of the improvements and advantages of the inventions disclosed in those patents. These improvements are accomplished primarily:

(a) By providing the clutch collar and shift yoke assembly with means for individually and yieldingly centering them in either of their shifted positions, so as to avoid rubbing engagement of the yoke assembly with the clutch collar in either of their shifted positions.

(b) By providing a spiral bevel gear drive between the propeller and cross shafts and locating them in substantially the same horizontal plane, so as to reduce the overhang or front-to-rear dimension of the unit with respect to the arrangement shown in Patent No. 2,120,594.

(c) By providing improved lubrication means for the front end of the propeller shaft.

(d) By providing a pinion cage support for the front end of the propeller shaft of sufficient size to permit the bevel gear to be inserted and removed through the front end of the gear housing, thereby making it possible to use a one-piece housing and yet avoiding the need for a large gear-removing opening in the base of the housing.

(e) By providing novel stop means for the shift lever, which will accurately and permanently stop the lever in its extreme shifted positions and maintain a constant range of shift movement throughout the life of the axle.

(f) By providing an anxle housing having a through propeller shaft adapting it for rear engine drives, and also having means for selectively transmitting power through two different speed reductions, and yet which is unusually compact and of minimum weight.

(g) By providing a two speed drive axle having a through propeller shaft and take-off means at one end thereof, so that power may be applied to another drive axle or vehicle accessories at propeller speed irrespective of whether the axle is in the low or high speed ratio.

(h) By providing other subordinate but yet important improvements which result in decreased cost and weight, and also greater compactness, without sacrificing strength or torque capacity of the axle.

Further objects of the invention will become apparent as the specification proceeds in connection with the annexed drawings, and the appended claims.

In the drawings:

Figure 4 is a view taken along the line 4—4 of Figure 1 showing the front of the housing as it appears when the pinion bearing cage is removed from the structure;

Figure 1:
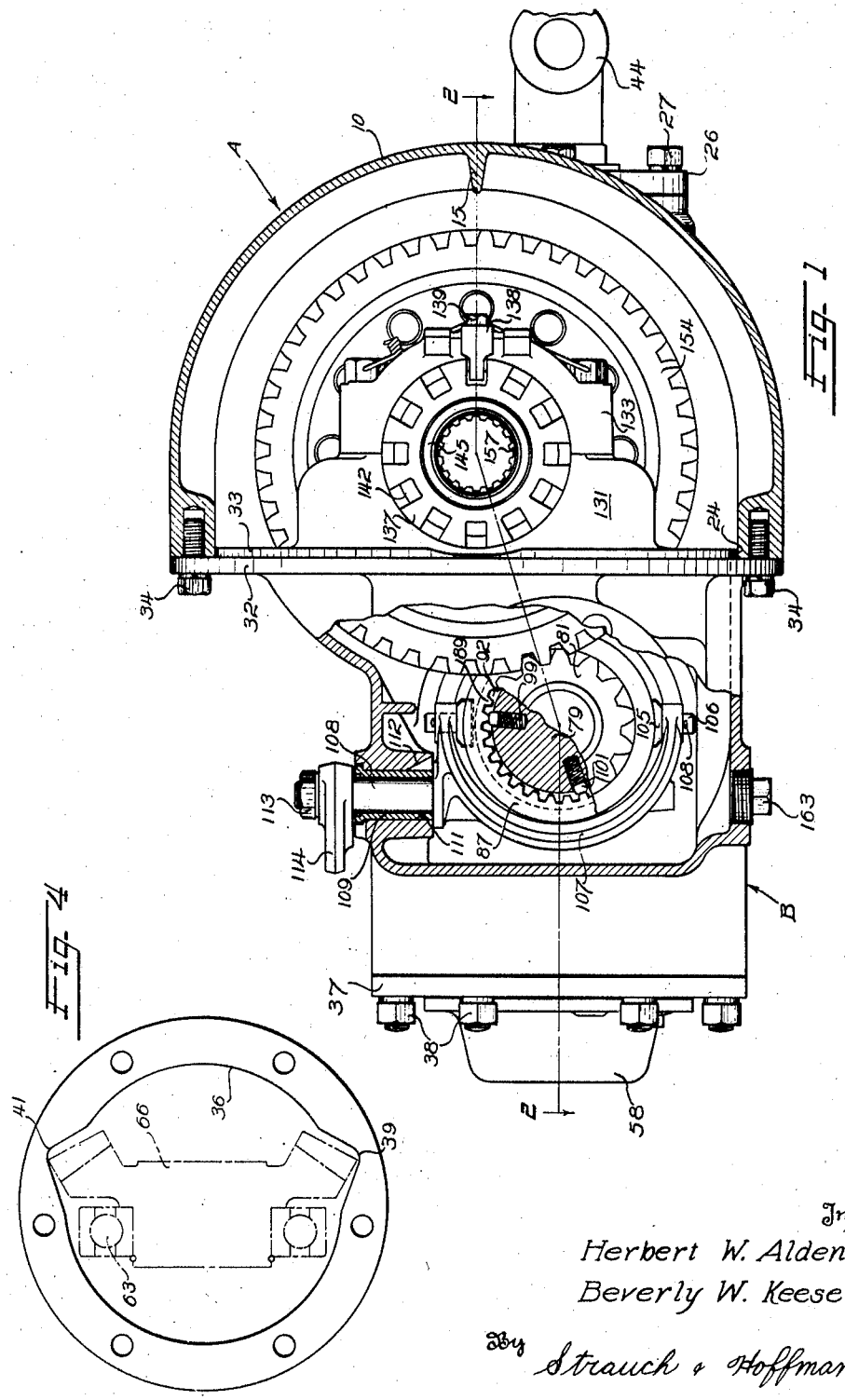
Figure 1 is a side elevational view, with certain parts broken away and others shown in section, of a drive axle embodying the invention.

With continued reference to the drawings, wherein like reference characters have been employed to designate like parts throughout the several figures thereof, in general the axle comprises a main housing section A, which carries the axle arms, and an auxiliary housing B, which contains the speed reducing gears and is detachably secured to the main housing, preferably after all of the parts thereof have been assembled in operative relationship.

Main housing A is provided with a hollow central portion 10 and a pair of reduced extensions 11 and 12, into which a pair of axle arms 13 and 14 are pressed. Portion 10 of the housing is preferably reinforced by an integrally cast internal flange 15, which extends from side to side of the housing. Flange 15 is cut away at 16 and 17 to avoid interference with the differential bearing assemblies, and is provided with a further recess 18 to provide running clearance for one of the helical spur gears, as will presently appear.

The outer ends of axle arms 13 and 14 are secured to the vehicle by springs or the like, in well-known manner. In the present instance, the axle has been illustrated as particularly adapted for rear engine vehicles such as buses, and therefore, as viewed in Figure 3, the structure at the top of the figure is the front of the axle, although the axle is not limited to such use. A pair of axle shafts 21 and 22 are rotatable in the axle arms and are coupled to the rear vehicle wheels in well-known manner.

The front of the main housing is provided with a substantially vertical front face 23 and an annular piloting surface 24. The propeller shaft or drive shaft passes through the main housing and is journalled at one end in the auxiliary housing and at the other end of the main housing. The main housing is provided with a rearwardly extending portion 25, to which a bearing support 26 is detachably secured by cap screws 27. Housing A is also provided with aligned openings 28 and 29 at opposite sides thereof and slightly below axle shaft 22, to allow the propeller shaft to extend from one side of the housing to the other and into the auxiliary housing.

Figure 2:
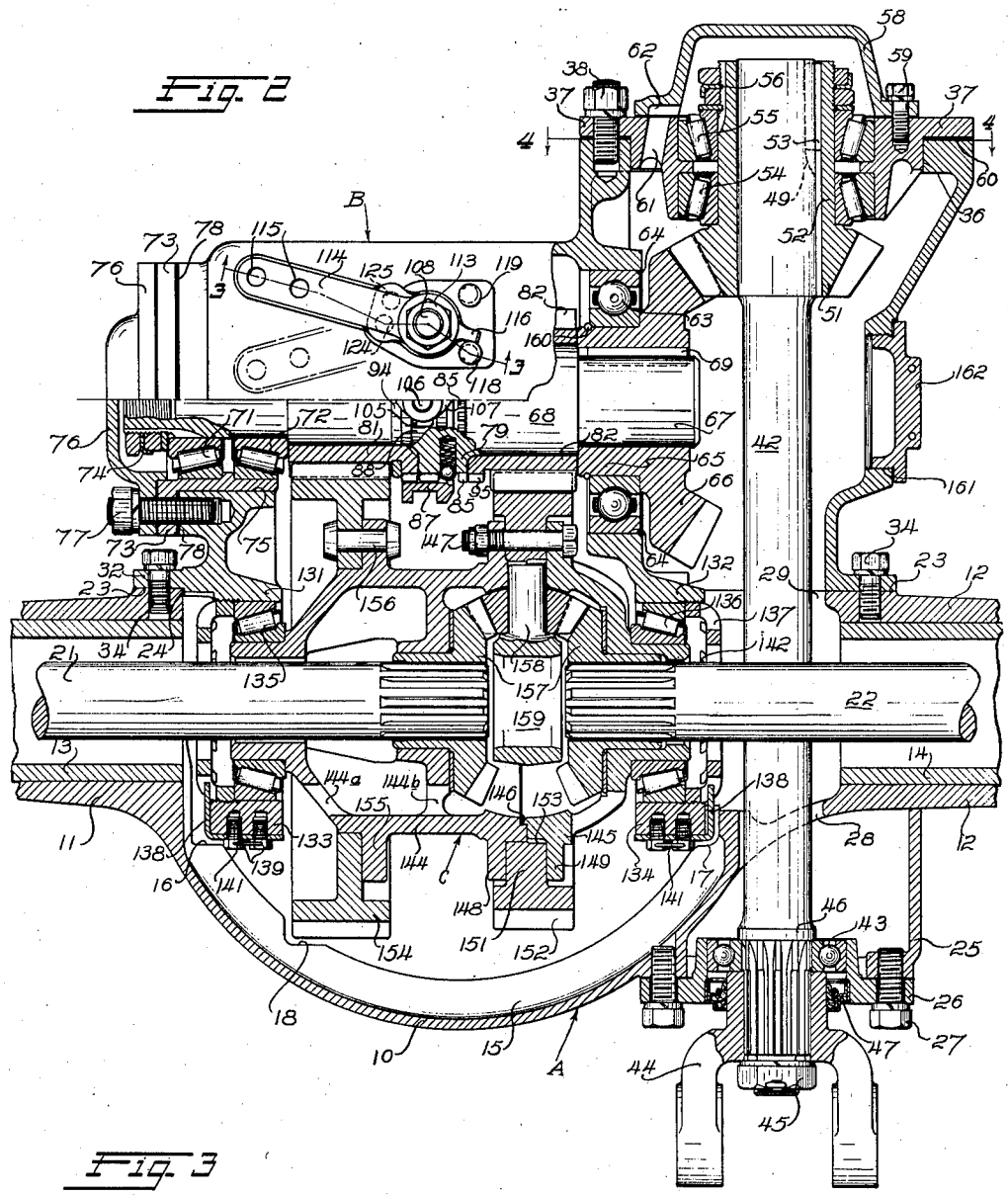
Figure 2 is a sectional view taken substantially along the line 2—2 of Figure 1, looking in the direction of the arrows.

Auxiliary housing B is provided with an annular attaching flange 32 and a pilot shoulder 33. As seen in Figures 1 and 2, the attaching flange is clamped in tight engagement with surface 23 of the main housing by a plurality of cap screws 34, and pilot shoulder 33 is disposed in engagement with wall 24. The auxiliary housing is accordingly properly located and strongly secured to the main housing, and when assembled, forms a unitary part thereof.

The front end of the auxiliary housing is of generally circular form and is provided with an opening 36, in which a pinion bearing supporting cage 37 is secured by a plurality of stud and nut assemblies 38. Opening 36 (Figure 4) is also provided with a pair of opposed recesses 39 and 41, for a purpose that will presently appear.

A propeller shaft 42 extends through the main and auxiliary housings and is journalled at its rear end in a bearing 43 carried by cage 26. Power may be applied to shaft 42 in any desired manner. It is preferably splined and secured to a universal joint member 44 by a nut 45, which also maintains the inner race of bearings 43 against shoulder 46 on the shaft. Cage 26 also carries a lubricant seal 47 for preventing the escape of lubricant from the housing.

The front end of shaft 42 is enlarged and provided with a keyway 94. A spiral bevel pinion 51, having a comparatively long hub 52, is pressed on the enlarged end of shaft 42 and is secured by a key 53. The pinion and shaft are journaled in cage 37 by means of a pair of tapered roller bearings 54 and 55, which are maintained in place on shaft 42 by a lock nut assembly 56.

By pressing the bevel pinion on shaft 42, and locating the bearings and their adjusting means directly on the hub of the gear, an extremely simple construction of minimum size and maximum strength is provided. The axial position of the pinion cage may be adjusted by shims 60.

The front end of the bearing and shaft assembly is enclosed by a cap 58 secured to cage 37 by cap screws 59. In order to provide adequate lubrication of the bearings, a passage 61 is provided in the cage and communicates with a port 62 in cap 58. Passage 61 is located opposite the bevel gear, so as to receive lubricant therefrom and conduct it to the bearings, as will hereinafter appear.

The front end of the auxiliary housing has been disclosed as closed by cap 58, because the particular axle shown is adapted for rear engine vehicles having but a single drive axle, but it is to be understood that, when the axle is to be embodied in a dual rear axle drive, cap 58 will be removed and replaced by a universal joint or like connection adapting it for transmitting power to the power input shaft of a second axle. The drive shaft and bevel pinion assembly just described transmits power to the countershaft assembly, preferably to a spiral bevel gear journalled for rotation about an axis located in the plane of the propeller shaft, to provide a close-coupled compact structure, as will now appear.

Journalled for rotation in an anti-friction bearing 63, located in a bearing support 64 provided in auxiliary housing B, is the hub 65 of a spiral bevel gear 66, which is pressed on the reduced end 67 of a countershaft 68, and secured against rotation by key 69.

The other end of the countershaft is journalled in a pair of anti-friction bearings 71 and 72 carried by a cage 73, and they are locked in place on the shaft by an adjusting nut assembly 74 in well-known manner. Cage 73 is supported in a seat 75 in the auxiliary housing and is secured in place, along with a closure cap 76, by means of cap screws 77. A number of shims 78 are located between the cage and the housing to provide for bodily axial adjustment of the countershaft to properly locate gear 66 with respect to the pinion, the outer race of bearing 63 having a sliding fit in recess 64 to allow the parts to be so adjusted.

The countershaft is provided with an enlarged portion or boss 79 intermediate its ends, and a low speed helical spur gear 81 is journalled on the countershaft between boss 79 and the inner race of bearing 72. A helical high speed spur gear 82 of opposite pitch to gear 81 is journalled on the countershaft between boss 79 and the hub of gear 66.

In order to avoid the double tolerances which are inherent in a bushing construction, and to also reduce the size of the parts to a minimum without sacrificing strength, gears 81 and 82 preferably operate in metal to metal contact with the countershaft. To provide extremely accurate centers of rotation, and to insure accurate mesh of the gears, the inner surfaces of gears 81 and 82, and the cooperating portions of the countershaft are ground to close limits; then coated with tin, copper or other non-ferrous metal; and then accurately burnished to final dimensions.

From the foregoing it is apparent that power applied to drive shaft 42 is efficiently transmitted to the countershaft through the bevel gear sets and which may be said to effect the first speed reduction in the axle. By means of the novel clutch mechanism to now be described, power is selectively transmitted from the counter-shaft to either gear 81 or 82.

Figures 5, 6, 7:
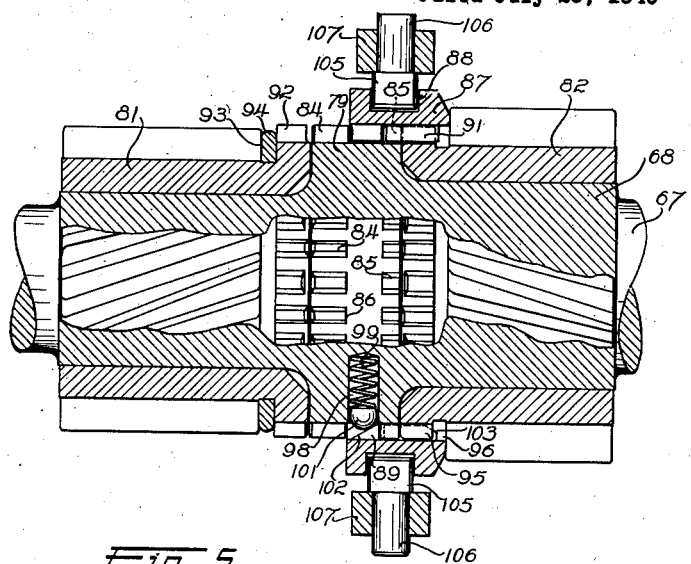
Figure 5 is a side elevational view of the clutch mechanism and the associated gears, on an enlarged scale, and with parts in section to more clearly illustrate the construction.
Figure 6 is a fragmental sectional view of an axle comprising a further embodiment of the invention.
Figure 7 is a diagrammatic further illustration of the axle of Figure 6.

Referring more particularly to Figure 5, boss 79 of the countershaft is provided with two rows of teeth 84 and 85. Teeth 84 are comparatively long, while teeth 85 are short so as to provide an annular space or groove 86 between the two rows of teeth. The outer ends of teeth 84 are chamfered, to facilitate engagement with the teeth of the collar, to be now described.

Mounted for axial sliding movement on teeth 84 and 85 of the countershaft is a clutch member 87, having an annular groove 88, internal teeth and a series of teeth 89. A second row of teeth 91 in the collar are of comparatively long axial length. Teeth 91 are symmetrically aligned with teeth 89.

Low ratio gear 81 is provided with a series of clutch teeth 92, spaced from the helical teeth to provide a groove 93 into which a ring 94 is sprung for a purpose that will presently appear. Teeth 92 are spaced apart to provide a close meshing fit with teeth 89, with substantially no back lash.

High ratio gear 82 is provided with a series of clutch teeth 95 which are spaced from the helical teeth to provide an annular groove 96. Teeth 95 have a close meshing fit with teeth 91 of the collar.

The clutch collar is accordingly mounted for axial sliding movement on the countershaft for selective engagement with the teeth of the low speed gear or the high speed gear. In order to provide for easy engagement without clash, alternate teeth of the clutch collar are cut back, and alternate teeth of gear 81 and teeth of gear 82 are cut back, as seen in Figure 5, so that when the collar is engaged with the clutch teeth of either of the gears, contact will first be made with the full length teeth. This will bring the parts into synchronism and, thereafter, further movement of the clutch collar will bring the cut back teeth of the clutch collar into mesh with the cut back of the gear.

The mechanism also embodies means for preventing any minor shifting of the clutch collar and eliminating the attendant wear, and also for preventing the clutch collar from inadvertently shifting at the point of power reversal. To this end, three bores 98, preferably located 120 degrees apart, are provided in countershaft boss 79. Located in each bore 98 is a compression spring 99 acting upon a ball detent 101. Three of the full length collar teeth 89 are cut away to provide a bevelled face 102, and three corresponding collar teeth 91 are cut away to provide a bevelled face 103, for cooperation with detents 101. Faces 102 and 103 are preferably disposed at an angle of approximately 30 degrees with the countershaft, so that the ball detents exert a strong holding action upon the collar in either of its shifted positions. Accordingly, no minor shifting movement of the clutch collar can occur, and it is likewise restrained against unintentional shifting movement when power reversals occur.

The clutch collar is preferably shifted by a novel mechanism embodying means for preventing it from undergoing minor movement when it is in either of its shifted positions, and also embodies novel means for accurately and permanently locating the range of movement it is to undergo in shifting from the low to the high speed position.

Figure 3:
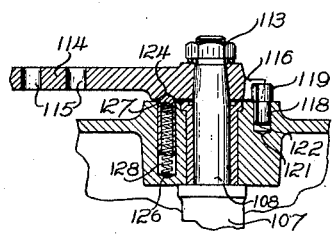
Figure 3 is a fragmental sectional view of an enlarged scale of the shifter arm, taken substantially along the line 3—3 of Figure 2.

Referring particularly to Figures 1 and 3 a pair of T-shaped blocks 105 are disposed in groove 88 of the clutch collar, and they have cylindrical shanks 106 journalled in the opposite ends of a yoke member 107. The blocks may be held in place on the yoke member by cotter pins 108 or the like and they have approximately one-sixteenth of an inch side clearance between the walls of groove 88. Yoke 107 is provided with a cylindrical shank 108 journalled for rocking movement in a bushing 109 pressed into a bore 111 in housing B. Bore 111 is provided with an angular enlargement 112 for a purpose that will presently appear.

Keyed or splined on the end of shaft 108, and secured by a nut 113 is a shift lever 114, having a pair of linkage connecting openings 115, and a reduced stop finger 116.

When the parts just described are assembled, lever 114 is rocked back and forth to shift the clutch collar into its high and low speed positions, and the positions of the lever for each shifted position of the clutch collar observed, and the yoke so located as to dispose members 105 centrally with respect to groove 88 and free from rubbing engagement.

When the high and low speed positions of lever 114 have been properly located from the high and low speed positions of the clutch collar, a pair of pins 118, having eccentric heads 119, are rotated into the proper position to cooperate with finger 116 of the lever and stop it in the proper positions, and they are then driven into openings 121 in the housing. Pins 118 are each provided with a groove 122 and, as they fit openings 121 rather tightly, when they are driven in place the metal of the housing extrudes slightly into the grooves of the pins, thereby permanently locking them against rotation.

It is accordingly apparent that pins 118 accurately stop the lever 114 in both of its shifted positions and, since they are permanently locked in the housing against rotation, the positions of eccentric heads 118 cannot change and possibly disturb the setting of the stops.

Lever 114 is also provided with means for preventing it from undergoing minor movement out of either of its shifted positions and thereby obviates wear of the yoke and connected parts.

Referring particularly to Figure 3, the underside of lever 114 is provided with a pair of conical recesses 124 and 125. Mounted for sliding movement in a bore 126 in the housing is a spherical headed detent member 127, which is urged into cooperation with recesses 124 and 125 by means of a compression spring 128. By locating recesses in the proper positions with respect to the shifted positions of lever 114, the latter is yieldingly but firmly restrained against minor rocking movement, and wear of the members 105 through rubbing engagement with the side walls of groove 88 is avoided.

Any desired form of linkage or Bowden cable mechanism may be employed to connect lever 114 to the driver's controls in the vehicle, it being understood that, since deflections of the axle with respect to the frame of the vehicle cannot result in inadvertent shifting of either the shift lever or the clutch collar, it is not necessary to employ any "snap action" or other trigger type devices for shifting the lever from one position to the other. In fact, if a certain degree of lost motion is present in the linkage, it may be taken up in response to axle deflection without producing minor shifting movements of any of the parts.

Power is transmitted from gears 81 and 82 to the axle shafts by the following novel mechanism.

Referring to Figures 1 and 2, the auxiliary housing is provided with a projecting pair of aligned bearing supports 131 and 132, and secured thereto, by a pair of bearing caps 133 and 134, are a pair of anti-friction bearings 135 and 136, respectively. The bearings are adjusted by flanged rings 137 threaded into the bearing supports and adapted to be locked in adjusted position by means of locking members 138, secured in place by pairs of cap screws 139 in the bearing caps, and locked against removal by a wire 141. Locking members 138 are adapted to cooperate with notches 142 provided in rings 137.

Journalled in bearings 135 and 136 is differential carrier structure C, which is made up of a pair of mating sections 144 and 145 secured together along a joint 146 by bolts 147.

Bolts 147 pass through a pair of flanges 148 and 149 formed on the housing carrier section, and through the flange 151 of a helical spur gear 152, which constantly meshes with high ratio gear 82. Splines 153 are provided on carrier section 145 at the base of the flange and cooperate with similar splines on gear 152 and positively lock the two against relative rotation.

A second helical spur gear 154, of slightly larger diameter than gear 152, constantly meshes with low speed gear 81 and is secured to a flange 155 on carrier section 144 by rivets 156. The inclination of the teeth of gears 81 and 82 are such that they thrust away from clutch collar 87, and gears 152 and 154 thrust toward each other. Gear 154 therefore thrusts toward flange 155, and takes a great part of the load off rivets 156.

Any desired form of differential mechanism may be employed. The one shown comprises a pair of differential side gears 157 splined to axle shafts 21 and 22 and journalled in the carrier. Gears 157 mesh with gears 158 carried by a spider 159 which is clamped between the housing sections in well-known manner. Passages 144a and 144b are provided in the carrier to conduct lubricant to the gears and bearings.

By securing gear 152 at the junction of the two carrier sections, the flanges rigidly back up both sides of the web of the gear, and the same bolts which hold the carrier section together also hold the gear in place, which makes for an extremely rigid mounting. Also, the splines on section 145 prevent relative rocking movement between the carrier and gear in operation.

The axle is preferably assembled as follows. Starting with the structure completely disassembled, with housing B removed from housing A, yoke 107, with blocks 105 in place, is inserted in the housing and shank portion 108 introduced in bore 111. The bore is cut away at 112 so that the yoke may be rocked to bring its shaft portion 108 into operative position (Figure 1). Bushing 109 is then pressed into bore 111, spring 128 and plunger 127 are then inserted in bore 126, and lever 114 is then secured in place on shaft 108 by nut 113.

Bevel gear 66 is preferably assembled with bearing 63 and held in place by a split ring 160. The gear and bearing assembly is then passed through opening 36 in housing B, the periphery of the gear being accommodated in recesses 39 and 41. The bearing is then slid into opening 64.

The countershaft, with all of its assembled parts, including gears 81, 82 and detents 101 and clutch collar 87 is introduced through opening 75 and the reduced end of the shaft, provided with key 69, is pressed into gear 66 as follows.

Located diametrically opposite the countershaft is a threaded opening 161 in housing B closed by a cap 162. Cap 162 is removed and a tool introduced through opening 161 having an annular face engaging the hub of gear 66. Pressure is then applied to the countershaft and to the tool to press the gear on the end of the shaft until it engages the shoulder. The tool is then removed and closure 161 replaced.

Bearing cage 73, containing bearings 71 and 72, is then slipped in place over the shaft, together with a sufficient number of shims 78 to give the proper axial countershaft adjustment. Lock nut assembly 74 is then adjusted to give the proper running clearance, and tightened. Cap member 76 is then applied, and cap screws 77 inserted and threaded home to lock all of the parts into final position.

The countershaft assembly is now completed and, after the proper range of lever 114 is determined, pins 118 are driven into the holes in the housing.

The differential carrier sections are then assembled, and gears 152 and 154 secured in place, together with bearings 135 and 136. The assembly is then placed in bearing supports 131 and 132 and clamped in place by caps 133 and 134, and the bearings are adjusted by members 138 to establish the proper running clearance.

The auxiliary housing is then applied to the main housing and secured in place by screws 34. Propeller shaft 42 is then inserted through the pinion cage opening, with pinion 51 pressed thereon. Bearing 43 and universal joint member 44 are then applied to the shaft and secured in place by nut 45. Cage 37, containing bearings 53 and 55, is then slid over the shaft and into opening 36 and secured in place by screws 38. Lock nut assembly 56 is then applied to the shaft and adjusted to establish the proper running clearance. The proper meshing of gears 51 and 66 is established by shims 40 under the pinion bearing cage flange, and shims 78 under the countershaft bearing cage flange.

Lubricant may then be introduced through opening 161 or any other suitable filler port, draining of the lubricant at suitable intervals being provided by a closure plug 163 located at the bottom of housing B. It is to be understood that the openings closed by plug 162 and 163 are also very important during the manufacturing process in securing the proper boring of surfaces 64 and 75 for the countershaft bearings and bore 111 for the yoke shaft bushing.

From the foregoing, it is apparent that the invention provides an extremely compact and efficient two speed axle of simple rugged design, in which the parts are subjected to a minimum of wear, and having a clutch mechanism which is automatically locked in either of the gear ratios.

In Figures 6 and 7 the axle is disclosed as modified and having a power take off for driving a generator, air compressor or like vehicle accessory.

Referring to Figures 6 and 7 propeller shaft 42a is provided with a tapered end 171 which projects through a modified cap 58a. The cap carries a seal 172 which cooperates in sealing engagement with a universal joint member 173. The latter is coupled to the drive shaft 174 of an electrical generator 175 by means of a propeller shaft 176 and a second universal joint 177. The generator is provided with an automatic cut-out in well-known manner, for closing the battery circuit whenever shaft 174 is rotated above the changing speed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive axle, a hollow main housing having a pair of axle arms projecting in opposite directions therefrom; a drive axle rotatable in each of said arms; a mating housing secured to said main housing and disposed substantially normal to said axle arms; an opening in said main housing aligning with a front opening and a rear opening in said mating housing; a bearing assembly in the opening in said main housing and a bearing assembly in the front opening of said mating housing, said bearing assemblies rotatably supporting a drive shaft disposed substantially normal to said axle arms; a countershaft journalled for rotation in said mating housing substantially at right angles to said drive shaft, a driven gear on said countershaft meshing with a driving gear on said drive shaft, means for transmitting power from said countershaft to said drive axles, the front end of said mating housing being of greater diameter than said driven gear; and recess means in the front opening in said mating housing sufficiently large to permit said driven gear to be withdrawn through said opening after said bearing assemblies and drive shaft have been removed.

2. In a drive axle, a hollow main housing having a pair of axle arms projecting in opposite directions therefrom. a drive axle rotatable in each of said arms; a forwardly extending mating housing secured to said main housing and disposed substantially normal to said axle arms; an opening in said main housing aligning with an opening in the front end of said mating housing, bearings in said openings rotatably supporting a drive shaft disposed substantially normal to said axle arms; a countershaft journalled for rotation in said mating housing substantially at right angles to said drive shaft, a driven gear pressed on said countershaft and meshing with a driving gear on said drive shaft, said countershaft projecting at one end through a wall of said mating housing and terminating at the other end inside said mating housing adjacent said drive shaft, and an opening in said mating housing opposite said other end of said countershaft of sufficient size to permit a tool to be applied to said driven gear for pressing it on said countershaft; the front end of said mating housing being of greater diameter than said driven gear and being provided with recess means associated with said front opening having an over-all dimension slightly larger than the diameter of said driven gear and operable to permit the latter to be withdrawn edgewise through the front end of said mating housing when said bearings and said drive shaft are removed; and means for transmitting power from said countershaft to said drive axles.

3. The drive axle defined in claim 1, wherein said recess means comprises a pair of substantially diametrically opposed notches in said mating housing contiguous with said opening, and one of said bearing assemblies embodies a removable cage having a portion bridging said notches.

4. In a drive axle, a housing having a pair of oppositely directed axle arms; an axle shaft rotatable in each of said axle arms; a drive shaft rotatably mounted in said housing about an axis disposed substantially normal to said axle arms and projecting from one side of said axle housing to the other in a substantially horizontal plane and passing closely adjacent one of said axle shafts; means for applying power to one end of said drive shaft; a countershaft disposed to one side of said axle shafts and mounted for rotation in said housing about an axis substantially parallel to said axle shafts, and offset from the level of said axle shafts and intersecting the axis of rotation of said drive shaft; a bevel gear on said drive shaft meshing with a bevel gear on said countershaft; a differential casing disposed in said housing concentric with said axle shafts and mounted for rotation in spaced bearings, each of said bearings being carried by a support in said housing, and said bearings and supports both being offset transversely from a vertical plane containing the axis of said drive shaft; and said bearing supports both projecting beyond the horizontal plane of said drive shaft.

5. The drive axle defined in claim 4, wherein said means for applying power to one end of said drive shaft is located to one side of said housing, and said countershaft is located on the other side of said housing, and means are provided for taking power off the opposite end of said drive shaft.

6. The drive axle defined in claim 4, wherein said drive shaft and said countershaft are disposed in a plane located below the level of said axle shafts, with said drive shaft passing below one of said axle shafts, and spaced less than a shaft diameter therefrom.

HERBERT W. ALDEN.
BEVERLY W. KEESE.